Patented Nov. 3, 1931

1,830,243

UNITED STATES PATENT OFFICE

MATHIAS M. REMMES, OF BELLEVILLE, NEW JERSEY, ASSIGNOR TO H. B. WIGGIN'S SONS COMPANY, OF BLOOMFIELD, NEW JERSEY, A CORPORATION OF NEW JERSEY

COATING COMPOSITION

No Drawing. Application filed November 1, 1928. Serial No. 316,621.

This invention relates to a coating composition and the general object thereof is a composition which may be applied to supports, such as the walls and ceiling of houses, to produce surfaces of pleasing appearance and novel textures.

Composition wall coatings are now in great demand for the decoration of walls and ceilings of houses, offices, stores, etc. The patented compositions and the compositions now on the market which I have tried out have many faults among which are principally that the compositions either crack or buckle after they have been applied to their supports, or contain so much oil that they do not harden to give a desirable coating, or they do not contain enough of the cementitious material to give a hard surface, but rather give a chalky surface which crumbles and forms a dust in the room. Furthermore, the majority of the coatings which are mixed with water are not practical because they require the addition of hot water and hot water is usually not obtainable in the vicinity of construction work. The coating composition which I have invented, and the coating made therefrom, overcome these faults of prior coating and give a tough hard surface which does not crumble or dust, and which can be mixed with cold water for application to the walls, or ceilings, and has other desirable properties, more fully specified below, which it is the object of the present invention to give.

One of the objects of the present invention is a composition coating which is easy to prepare for application to its support.

Another object of the invention is a composition coating which may be prepared for application to the support by merely mixing with cold water.

A further object of the invention is a composition coating which hardens on its support without shrinkage or cracking.

A still further object of the present invention is a composition coating which hardens on the support without change of texture.

Still another object of the present invention is a composition coating which does not run or wilt after application to the support so that the workman applying the composition may work up the desired effect on the wall and then be assured that the effect will remain as it was worked up.

Another object of the present invention is a coating composition which contains no glue or other animal matter and has no objectionable odor at the time it is applied or thereafter, particularly if the walls should become damp.

Still another object of the present invention is a coating composition which is substantially neutral so that it will not damage woodwork with which it contacts nor affect colors or pigments applied to it or mixed with it.

Another object of the present invention is a coating composition which is extremely hard and not easily marred.

A further object of the present invention is a coating composition which will remain plastic and workable in the mixing pail for several hours after mixing to allow the workman adequate time to apply the composition to the support.

Other objects and features of the invention will more fully appear from the following description and will be particularly pointed out in the claims.

The composition which is the subject of the present invention is intended especially to be used as a coating for walls and ceilings and, although the composition has numerous other uses, it will be described in connection with its application to walls. Such description is intended to be illustrative and in no sense limiting and it is to be considered as illustrating only one of the methods of preparing and using the composition.

The composition includes a material which when mixed with water and exposed to the air will set or harden. The material may be a non-alkaline cementitious material such as Keen's cement or plaster of Paris. Keen's cement, which is a gypsum cement, has been used with great success, and plaster of Paris has been used to a lesser extent. The material is finely ground and screened to remove all lumps so that when mixed with water the resulting mass is smooth and workable either with a brush, a trowel, or other implement which may be used to apply it to the wall or other support which the composition is to cover.

The cement, or plaster of Paris, and particularly the cement, enables the composition to set without change of texture and to become extremely hard and resistant to wear. It is important that the cementitious material be over 60% of the weight of the dry composition before the water is added and that it be a non-alkaline material. Alkaline materials such as Portland cement, are not desirable.

Another constituent of the composition is a viscous material, such as a gum, which makes the composition very smooth and increases its property of flowing under a brush or trowel when the composition is applied. This material is preferably soluble in cold water so that when the composition is mixed with cold water preparatory to its application to the wall, the gum will dissolve and thus distribute itself uniformly throughout the composition. Gum arabic and gum tragacanth, alone or mixed, have been used with excellent results in the preparation of the composition. These are vegetable gums and are odorless so that the composition does not give off the offensive odor as frequently happens when animal matter is used. The viscous material is believed to fill any minute interstices in the composition as it hardens to render it more impervious.

Asbestos is another element of the composition and is preferably used in the form of short fibers. It serves to toughen the composition and hold it together when it is being applied to a surface, and also serves to assist the composition to hold its points and stand up when a rough surface effect is desired. The asbestos is compressible and, if there is any expansion of the composition, the asbestos takes it up and prevents buckling or blistering of the composition. Due to its bulk the asbestos also serves as a filler, but is preferable to the usual fillers which merely give bulk, because asbestos gives bulk and at the same time imparts its desirable characteristics to the composition.

Another of the ingredients of the composition is mica, which acts as an internal lubricant for the composition, enabling it to be spread very easily, and improving its working qualities. The mica is preferably ground to approximately 100 mesh, and represents approximately 10% of the weight of the entire composition. In addition to these characteristics the mica gives a desirable sheen to the material, and by its light weight increases the bulk of a pound of the finished material, and thereby increases the covering capacity. However, mica is preferable to the usual inert fillers because it not only increases the covering capacity but makes the composition much better.

Mere fillers may be used if desired, but their use is not recommended as they serve merely to increase the bulk without adding any desirable properties to the composition.

Alum is used when the composition is made with Keen's cement, to reduce the contraction of the composition during setting and also to give additional hardness. Potash alum is preferably used and in the proportion hereinafter mentioned.

Some brands of Keen's cement give a slightly acid reaction and therefore, as it is desirable to have the composition substantially neutral, the required amount of hydrated lime, or similar alkali, is added where necessary to neutralize the acidity. This is done because coating compositions are usually applied to the walls of a building after the woodwork has been painted, and it usually happens that some of the composition comes in contact with the woodwork, either purposely or by accident, with the result that the paint is marred if the composition is either acid or alkaline; but with a coating composition which is substantially neutral the paint is not marred, so that the neutral composition may be joined directly to the woodwork, for instance, around a door frame, with no unsightly marks resulting from the contact.

Cold water paste is added to retard the setting of the composition and allow the workmen ample time for applying the composition to the wall and working up the desired texture. It also permits the use of cold water in preparing the composition for use, which is not true of a composition containing the usual glue or other materials which require hot water for their solution.

Colors may be added as desired. Either a pigment color or a water soluble color may be used. Very beautiful effects are obtained by staining the mica particles one color before they are put into the composition and then adding a constrasting color to the body of the composition. Due to the fact that the composition is neither acid nor alkaline the numbers and kinds of pigments and colors which may be used are very large.

In making the composition, the dry materials, except the asbestos and mica, are preferably ground and screened separately to remove all foreign matter and lumps. They are then mixed in the desired proportions, at which time the desired proportion of asbestos and mica which have previously been so prepared as to free them from lump but not shorten the fibers of the asbestos, are mixed in. The material is then tested for neutrality and the necessary amount of hydrated lime or similar alkali added. This prepared material is then packaged for shipment. The workmen merely adds the cold water preparatory to applying it to the surface to be covered. Dry colors may be added when the dry materials are mixed, or dry colors, oil colors or water soluble colors may be added by the workman at the time he prepares the composition for application to the wall.

One of the compositions now used with very satisfactory results, comprises 100 pounds of Keen's cement, 5 pounds of powdered alum, 5 pounds of gum arabic, 5 pounds of cold water soluble paste, 10 pounds of asbestos, and 12½ pounds of mica. The amount of cold water paste which is used in this composition is sufficient to delay the setting of the composition, so that a workman can mix the composition in the morning with the assurance that it will remain workable throughout the day. It should be noted that this composition contains over 60% of Keen's cement or its equivalent, which is important, because it enables the obtaining of a coating which is hard and durable. The use of the large amount of base material renders the finished coating one in which the strength is obtained by the interlocking of the crystals as the composition sets. My composition differs from previous compositions in which the strength was obtained by the action of glue or a similar adhesive or binder which merely bound together the inert particles from which the composition was obtained. Such previous compositions hardened by the evaporation of water from the glue or other adhesive composition, rather than by a chemical reaction with the base material of the composition to obtain interlocking crystalline structures within the composition.

A convenient way to prepare the composition is to mix the cement, alum, gum, cold water paste, and asbestos and mica in the proportions given. To the amount (137½ pounds) of the dry composition above given, 34 quarts of cold water are added and the mixture is stirred until there are no lumps and the composition is homogeneous. Colors may be added as described above, in the amounts desired. These quantities produce approximately 14 gallons of the composition. The addition of more water will thin the composition so that it will have a lighter consistency.

The composition is preferably applied to a slightly rough surface which assist the composition in remaining in position. To obtain the best results, the walls to which the composition is to be applied should be pointed up as for painting. Any plaster walls, either brown coat or white coat, as well as brick, concrete or other absorbent surfaces should be properly sized to reduce their properties of absorbing the liquid from the composition. Painted walls should be wire brushed to cut though the paint and afford a proper anchorage for the composition. Papered or alcimined walls should be thoroughly cleaned and if smooth, they should be roughened up with a wire brush. Where wall boards are to be covered after they are in place, the joints should be well filled, either with the composition herein described or with other suitable filling material and the wall boards should be sized as above described. If desired, strips of canvas or other suitable material may be fastened over the joints in the wall boards. In some cases the wall boards are covered with the composition and the desired effect is worked up before they are put in place to form the wall of the room. The joints of the wall boards may then be covered with wooden strips which are then painted or decorated, as desired, to give the wall of the room a panel effect.

Frequently the wall of a room is covered with a fabric, such as an open mesh canvas which is fastened to the wall and then the composition is applied to the canvas. If this be done the composition and canvas may be easily stripped from the walls without injury to the surface whenever it is desired to change the decoration of the room.

The composition may be applied to the wall with any suitable instrument such as a brush, sponge or trowel and may be worked up to give the desired effect by a brush, sponge, wads of paper, cork float, whisk broom or other instrument, according to the wishes of the decorator who finishes the walls.

After the coating is on the wall a glaze may be applied in any suitable manner, as for instance, by a brush or an air brush. Likewise, paint may be applied to the composition after it is on the wall, in order to give the wall the desired color. By applying the glaze or paint, or both, and then wiping or strippling the wall, very interesting irregular effects may be obtained. Many other methods of using the composition and working it up will suggest themselves to the experienced builder or decorator.

It is evident from the above description that there are many methods of making and using the composition and it is desired that the invention be construed as broadly as the claims taken in conjunction with the prior art may allow.

I claim:

1. A dry mixture adapted to be mixed with water for a coating composition, and then to be applied to a support, including substantially 100 pounds of Keen's cement, substantially 5 pounds of alum, gum arabic, and cold water paste.

2. A dry mixture adapted to be mixed with water for a coating composition, and then to be applied to a support, including substantially 100 pounds of Keen's cement, alum, substantially 5 pounds of gum arabic, and cold water paste.

3. A dry mixture adapted to be mixed with water for a coating composition, and then to be applied to a support, including substantially 100 pounds of Keen's cement, alum, gum arabic, and substantially 5 pounds of cold water paste.

In testimony that I claim the foregoing, I have hereunto set my hand this 29th day of October, 1928.

MATHIAS M. REMMES.